(12) United States Patent
Nair et al.

(10) Patent No.: US 8,883,297 B2
(45) Date of Patent: Nov. 11, 2014

(54) METHODS FOR BONDING POROUS FLEXIBLE MEMBRANES USING SOLVENT

(75) Inventors: Suresh Kumar Surapalan Nair, Fremont, CA (US); Majid Keshavarz, Pleasanton, CA (US); Saroj Kumar Sahu, Mountain House, CA (US)

(73) Assignee: Imergy Power Systems, Inc., Fremont, CA (US)

( * ) Notice: Subject to any disclaimer, the term of this patent is extended or adjusted under 35 U.S.C. 154(b) by 619 days.

(21) Appl. No.: 12/577,131

(22) Filed: Oct. 9, 2009

(65) Prior Publication Data

US 2010/0092757 A1 Apr. 15, 2010

Related U.S. Application Data (60) Provisional application No. 61/104,611, filed on Oct. 10, 2008.

(51) Int. Cl.
*B32B 37/12* (2006.01)
*H01M 2/16* (2006.01)
*H01M 8/18* (2006.01)
*B01D 65/00* (2006.01)

(52) U.S. Cl.
CPC .......... *B01D 65/003* (2013.01); *B01D 2313/04* (2013.01); *H01M 8/188* (2013.01); *Y02E 60/528* (2013.01)
USPC ..................... 428/306.6; 156/308.2; 429/101; 429/252; 429/254

(58) Field of Classification Search
USPC ............... 429/120, 101, 252, 254; 428/306.6; 156/308.2
See application file for complete search history.

(56) References Cited

U.S. PATENT DOCUMENTS

| | | |
|---|---|---|
| 3,540,934 A | 11/1970 | Boeke |
| 3,996,064 A | 12/1976 | Thaller |
| 4,133,941 A | 1/1979 | Sheibley |

(Continued)

FOREIGN PATENT DOCUMENTS

| | | |
|---|---|---|
| DE | 102006007206 | 10/2006 |
| JP | 60047373 | 3/1985 |

(Continued)

OTHER PUBLICATIONS

PCT International Search Report and the Written Opinion mailed Dec. 10, 2009, in related International Application No. PCT/US2009/060281.

(Continued)

*Primary Examiner* — Sean P Cullen
(74) *Attorney, Agent, or Firm* — Haynes and Boone, LLP (57) ABSTRACT

A method for bonding a porous flexible membrane to a rigid material is disclosed. In some embodiments, the method includes applying, at a bonding site of the porous membrane, a pre-treatment solvent solution, drying the bonding site of the porous membrane, applying, at a bonding site of the rigid structure, a first solvent that is capable of dissolving a surface of the rigid material, applying, at the bonding site of the porous membrane, a second solvent that is capable of dissolving the polymeric residue material dissolved in the pre-treatment solvent solution, and pressing the porous membrane to the rigid material at their respective bonding sites. In some embodiments, the pre-treatment solvent solution may include a solvent carrying dissolved polymeric residue material configured to fill the pores of the porous membrane at the bonding site of the porous membrane.

10 Claims, 9 Drawing Sheets

(56) References Cited

U.S. PATENT DOCUMENTS

| | | | |
|---|---|---|---|
| 4,159,366 A | 6/1979 | Thaller | |
| 4,309,372 A | 1/1982 | Sheibley | |
| 4,312,735 A | 1/1982 | Grimes et al. | |
| 4,414,090 A | 11/1983 | D'Agostino et al. | |
| 4,454,649 A | 6/1984 | Jalan et al. | |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A | 9/1985 | Gahn et al. | |
| 4,732,827 A | 3/1988 | Kaneko et al. | |
| 4,784,924 A | 11/1988 | Savinell et al. | |
| 4,814,241 A | 3/1989 | Nagashima et al. | |
| 4,828,666 A | 5/1989 | Iizuka et al. | |
| 4,849,311 A | 7/1989 | Itoh et al. | |
| 4,874,483 A | 10/1989 | Wakabayashi et al. | |
| 4,882,241 A | 11/1989 | Heinzel | |
| 4,894,294 A | 1/1990 | Ashizawa et al. | |
| 4,929,325 A | 5/1990 | Bowen et al. | |
| 4,945,019 A | 7/1990 | Bowen et al. | |
| 4,948,681 A | 8/1990 | Zagrodnik et al. | |
| 4,956,244 A | 9/1990 | Shimizu et al. | |
| 5,026,479 A | 6/1991 | Bikson et al. | |
| 5,061,578 A | 10/1991 | Kozuma et al. | |
| 5,126,054 A | 6/1992 | Matkovich | |
| 5,162,168 A | 11/1992 | Downing et al. | |
| 5,188,911 A | 2/1993 | Downing et al. | |
| 5,258,241 A | 11/1993 | Ledjeff et al. | |
| 5,366,824 A | 11/1994 | Nozaki et al. | |
| 5,447,636 A * | 9/1995 | Banerjee | 210/638 |
| 5,648,184 A | 7/1997 | Inoue et al. | |
| 5,656,390 A | 8/1997 | Kageyama et al. | |
| 5,665,212 A | 9/1997 | Zhong et al. | |
| 5,759,711 A | 6/1998 | Miyabayashi et al. | |
| 5,851,694 A | 12/1998 | Miyabayashi et al. | |
| 5,854,327 A | 12/1998 | Davis et al. | |
| 5,919,330 A | 7/1999 | Pall et al. | |
| 6,005,183 A | 12/1999 | Akai et al. | |
| 6,040,075 A | 3/2000 | Adcock et al. | |
| 6,086,643 A | 7/2000 | Clark et al. | |
| 6,225,368 B1 | 5/2001 | D'Agostino et al. | |
| 6,387,964 B1 | 5/2002 | D'Agostino et al. | |
| 6,461,772 B1 | 10/2002 | Miyake et al. | |
| 6,475,661 B1 | 11/2002 | Pellegri et al. | |
| 6,509,119 B1 | 1/2003 | Kobayashi et al. | |
| 6,524,452 B1 | 2/2003 | Clark et al. | |
| 6,555,267 B1 | 4/2003 | Broman et al. | |
| 6,562,514 B1 | 5/2003 | Kazacos et al. | |
| 6,692,862 B1 | 2/2004 | Zocchi | |
| 6,759,158 B2 | 7/2004 | Tomazic | |
| 6,761,945 B1 | 7/2004 | Adachi et al. | |
| 6,764,789 B1 | 7/2004 | Sekiguchi et al. | |
| 6,905,797 B2 | 6/2005 | Broman et al. | |
| 6,986,966 B2 | 1/2006 | Clarke et al. | |
| 7,061,205 B2 | 6/2006 | Shigematsu et al. | |
| 7,078,123 B2 | 7/2006 | Kazacos et al. | |
| 7,199,550 B2 | 4/2007 | Tsutsui et al. | |
| 7,220,515 B2 | 5/2007 | Ito et al. | |
| 7,227,275 B2 | 6/2007 | Hennessy et al. | |
| 2001/0017188 A1* | 8/2001 | Cooley et al. | 156/305 |
| 2003/0008203 A1 | 1/2003 | Winter | |
| 2003/0113633 A1* | 6/2003 | Nishimura et al. | 429/252 |
| 2004/0170893 A1 | 9/2004 | Nakaishi et al. | |
| 2004/0202915 A1 | 10/2004 | Nakaishi et al. | |
| 2004/0241544 A1 | 12/2004 | Nakaishi et al. | |
| 2005/0074653 A1 | 4/2005 | Broman et al. | |
| 2005/0156431 A1 | 7/2005 | Hennessy | |
| 2005/0156432 A1 | 7/2005 | Hennessy | |
| 2005/0158615 A1 | 7/2005 | Samuel et al. | |
| 2005/0164075 A1 | 7/2005 | Kumamoto et al. | |
| 2005/0181273 A1 | 8/2005 | Deguchi et al. | |
| 2005/0260473 A1 | 11/2005 | Wang | |
| 2007/0072067 A1 | 3/2007 | Symons et al. | |
| 2007/0080666 A1 | 4/2007 | Ritter et al. | |
| 2007/0111089 A1 | 5/2007 | Swan | |
| 2008/0081247 A1 | 4/2008 | Nakaishi et al. | |
| 2008/0193828 A1 | 8/2008 | Sahu | |
| 2009/0218984 A1 | 9/2009 | Parakulam | |
| 2010/0003586 A1 | 1/2010 | Sahu | |
| 2010/0090651 A1 | 4/2010 | Sahu | |
| 2010/0092757 A1 | 4/2010 | Nair | |
| 2010/0092807 A1 | 4/2010 | Sahu | |
| 2010/0092813 A1 | 4/2010 | Sahu | |
| 2010/0092843 A1 | 4/2010 | Conway | |
| 2010/0094468 A1 | 4/2010 | Sahu | |
| 2010/0136455 A1 | 6/2010 | Winter | |
| 2010/0143781 A1 | 6/2010 | Keshavarz | |

FOREIGN PATENT DOCUMENTS

| | | |
|---|---|---|
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 9306626 | 4/1993 |
| WO | 03005476 | 1/2003 |
| WO | 2004079849 | 9/2004 |
| WO | 2006135958 | 12/2006 |

OTHER PUBLICATIONS

Office Action for U.S. Appl. No. 12/217,059 mailed Aug. 23, 2010.
Office Action for U.S. Appl. No. 12/577,137 mailed Sep. 7, 2010.

* cited by examiner

METHODS FOR BONDING POROUS FLEXIBLE MEMBRANES USING SOLVENT

CROSS-REFERENCE TO RELATED APPLICATIONS

The present application claims benefit under 35 U.S.C. §119(e) of U.S. Provisional Application No. 61/104,611 filed on Oct. 10, 2008, entitled "Methods of Bonding Porous Membranes Using Solvent," the content of which is hereby incorporated by reference in its entirety.

BACKGROUND

1. Technical Field

The present invention relates to the field of bonding materials using solvents and, in particular, to methods for using solvents to bond porous flexible membranes to rigid materials.

2. Discussion of Related Art

Porous flexible membranes have broad technical applications including, for example, gas separation, particle filtration, reverse osmosis, water purification, fuel cell, and flow cell battery technologies. In such applications, porous flexible membrane materials are often used in conjunction with structures made of rigid materials. Therefore, porous flexible membranes are commonly bonded or compressively sealed with rigid structures.

In certain applications, porous flexible membranes are utilized in an aqueous solution. For example, in a reduction-oxidation (redox) flow battery or redox flow cell, two-half cells may be separated by a porous flexible ion-exchange membrane (IEM), through which ions are transferred during a redox reaction. Electrolytes (anolyte and catholyte) are flowed through the half-cells as the redox reaction occurs, often with an external pumping system. In this manner, the porous flexible IEM in a flow cell battery operates in an aqueous electrolyte solution.

To effectively separate the two half-cells of a flow cell battery and to structurally integrate the porous flexible IEM into the battery, the IEM is commonly mounted to a rigid frame. However, porous flexible membrane materials often absorb moisture and expand when wetted. Accordingly, if the IEM is mounted to the rigid frame in a non-aqueous medium and later wetted, the IEM will expand and ripple (i.e., become non-planar) within the frame. In the context of a flow cell battery, this rippling can adversely affect the overall efficiency and performance of the cell.

Therefore, it is desirable to develop methods for bonding porous flexible membranes to rigid materials that reduce the problems associated with the expansion of membranes in aqueous solutions.

SUMMARY

Consistent with some embodiments of the present invention, a method for bonding a porous flexible membrane to a rigid material includes applying, at a bonding site of the porous flexible membrane, a pre-treatment solvent solution, the pre-treatment solvent solution comprising a solvent carrying dissolved residue material, the dissolved residue material being configured to fill the pores of the porous flexible membrane at the bonding site of the porous flexible membrane; drying the bonding site of the porous flexible membrane; applying, at a bonding site of the rigid structure, a first solvent that is capable of dissolving a surface of the rigid material; applying, at the bonding site of the porous flexible membrane, a second solvent that dissolves the residue material from the pre-treatment solvent solution; and pressing the porous flexible membrane to the rigid material at their respecting bonding sites.

Consistent with some embodiments of the present invention, an apparatus integrating a porous flexible membrane includes a porous flexible membrane, the porous flexible membrane including a bonding site; and a rigid material bonded to the porous flexible membrane at the bonding site, wherein the bond at the bonding site is a volume bond comprising a residue material embedded within the pores of the porous flexible membrane that is bonded to the rigid material by solvent bonding.

Further embodiments and aspects of the invention are discussed with respect to the following figures, which are incorporated in and constitute a part of this specification.

BRIEF DESCRIPTION OF THE DRAWINGS

In the figures, elements having the same designation have the same or similar functions. Relative sizes and distances depicted in the figures are for convenience of illustration and have no further meaning.

DETAILED DESCRIPTION

Figure 1:
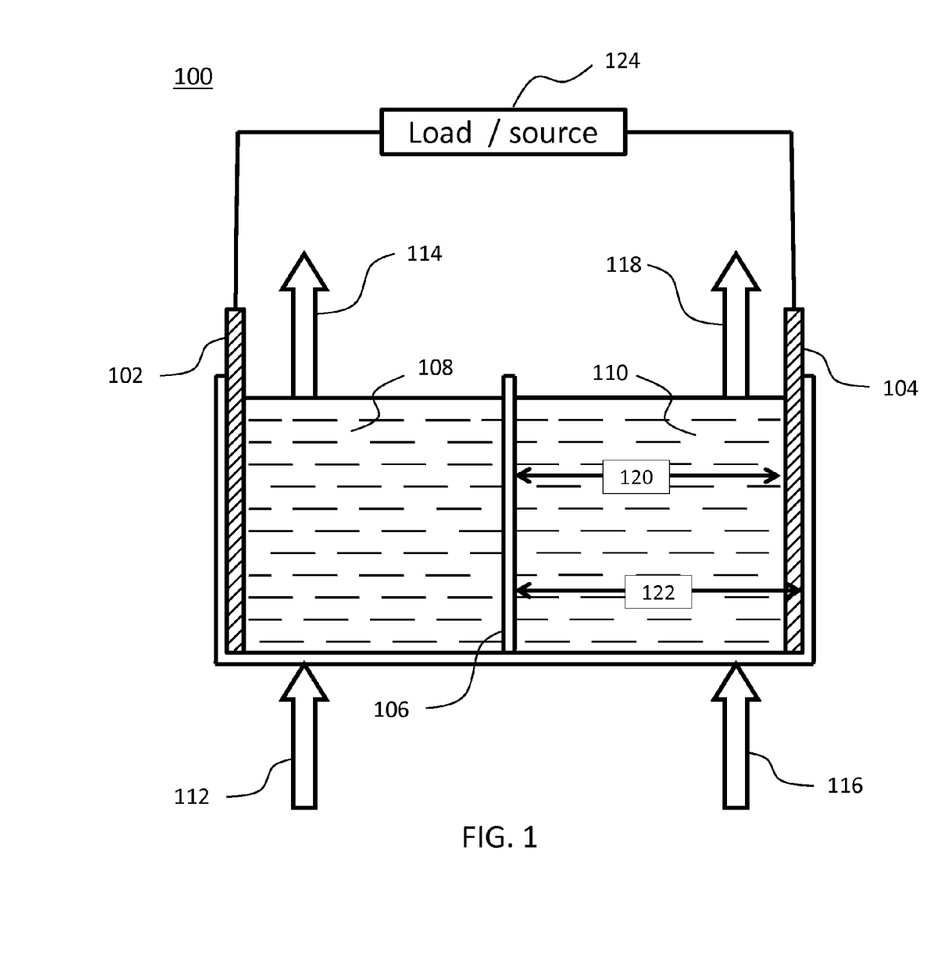
FIG. 1 illustrates a redox flow cell filled with electrolyte solution consistent with embodiments of the present invention.

FIG. 1 illustrates a reduction-oxidation (redox) flow cell 100 filled with electrolyte solution consistent with some embodiments of the present invention. Redox flow cell 100 includes two half-cells 108 and 110 separated by porous flexible membrane 106. In some embodiments, the porous flexible membrane may be an ion exchange membrane (IEM). Half-cells 108 and 110 include electrodes 102 and 104 respectively, in contact with an electrolyte such that an anodic reaction occurs at the surface of one of electrodes 102 or 104 and a cathodic reaction occurs at the surface of the other one of electrodes 102 or 104. In some embodiments, multiple redox flow cells 100 can be electrically coupled (e.g., stacked) either in series to achieve higher voltage, in parallel in order to achieve higher current, or both. In such cases, the electrolyte fluids flow in parallel to the half cells through a manifold. When filled with electrolyte, one half-cell (e.g., 108 or 110) of redox flow cell 100 contains an anolyte and the other half-cell contains a catholyte, the anolyte and catholyte being collectively referred to as electrolytes. Reactant electrolytes may be stored in separate tanks and dispensed into the half-cells 108 and 110 via pipes, tubes, and the like (not shown) coupled to cell input/output (I/O) ports 112, 114 and 116, 118 respectively, often using an external pumping system.

At least one electrode 102 and 104 in each half-cell 108 and 110 provides a surface on which the redox reaction takes place and from which charge is transferred. Redox flow cell 100 operates by changing the oxidation state of its constituents during charging or discharging. The two half-cells 108 and 110 are connected in series by the conductive electrolytes, one for anodic reaction and the other for cathodic reaction. In operation (i.e., charge or discharge), electrolyte (i.e., anolyte or catholyte) is flowed through half-cells 108 and 110 through I/O ports 112, 114 and 116, 118, respectively as the redox reaction takes place. Positive ions or negative ions pass through the porous flexible membrane 106 separating the two half-cells 108 and 110 as the redox flow cell 100 charges or discharges. Reactant electrolytes are flowed through half-cells 108 and 110, as necessary, in a controlled manner to supply electrical power or be charged by load/source 124.

Porous flexible membrane 106 may absorb moisture and expand when placed in an aqueous solution (i.e., wetted). Electrolytes used in flow batteries, for example, can be aqueous solutions of salts. In some embodiments, porous flexible membranes may be sheets of woven or non-woven plastic with active ion exchange materials such as resins or functionalities embedded either in a heterogeneous (e.g., co-extrusion) or homogeneous (e.g., radiation grafting) way. Porous flexible membrane 106 may be a porous flexible membrane having high voltaic efficiency Ev and high coulombic efficiency and may be designed to limit mass transfer through the membrane to a minimum while still facilitating ionic transfer. In some embodiments porous flexible membrane 106 may be made from a polyolefin (polyalkene) material and may have a specified thickness and pore diameter. A manufacturer, having the capability to manufacture these membranes, and other membranes consistent with embodiments of the present invention, is for example Daramic Microporous Products, L.P., N. Community House Rd., Suite 35, Charlotte, N.C. 28277. In certain embodiments, porous flexible membrane 106 may be a non-ion-selective microporous plastic separator also manufactured by Daramic Microporous Products L.P.

Membranes consistent with embodiments of the present invention can be produced by extruding sheets of polyolefin with or without fillers such as silicon dioxide (silica) particles or fibers, and with oil particulates heterogeneously spread throughout the body of the sheet. After the extrusion, the sheet can be treated with a solvent or etchant to remove the oil particles, leaving behind pores. Properties like the thickness, pore size, pore density, and tortuosity are heavily process dependent and are often closely-guarded secrets of the manufacturer. These parameters, however, can be specified to the manufacturer for production. In some embodiments, membranes consistent with embodiments of the present invention can be designed to have an advantageous figure-of-merit (FOM) to improve voltage and coulombic efficiency as discussed in application Ser. No. 12/217,059 to Sahu, filed on Jul. 1, 2008, assigned to the same assignee as the present invention, and herein incorporated by reference in its entirety.

In certain embodiments, the redox reaction takes place in an aqueous acidic medium. In some embodiments, the electrolyte in half-cell 108 is an acidic solution of $FeCl_2$, forming a cathode side of redox flow cell 100. In some embodiments, the electrolyte in half-cell 110 is an acidic solution of $CrCl_3$, forming an anode size of redox flow cell 100. Accordingly, in operation, porous flexible membrane 106 is typically utilized in an aqueous electrolyte solution.

To integrate porous flexible membrane 106 within the structure of redox flow cell 100, porous flexible membrane 106 may be bonded to a rigid frame. In certain embodiments, the rigid frame may be designed not only to provide support for mounting porous flexible membrane 106 within redox flow cell 100, but also to provide even spacing between porous flexible membrane 106 and electrodes 102 and 104 within each half-cell 108 and 110. Providing even spacing between porous flexible membrane 106 and electrodes 102 and 104 optimizes the efficiency of redox flow cell 100 by ensuring an even distribution of electrolyte within half-cells 108 and 110 and equal electrolyte flow resistance through half-cells 108 and 110.

In some embodiments, porous flexible membrane 106 may be bonded to a rigid frame constructed using, for example, polyvinyl chloride (PVC) or poly methyl methacrylate (PMMA) material using solvent bonding. In some embodiments, the rigid frame may be constructed using other rigid materials capable of being bonded to porous flexible membrane 106 using solvent bonding techniques. To create an optimal bond between the rigid frame and porous flexible membrane 106 using conventional solvent bonding techniques, porous flexible membrane 106 is first cleaned and dried such that particulates and/or moisture at the bonding site of porous flexible membrane 106 and the frame are removed. Cleaning and drying the bonding site of porous flexible membrane 106 and the rigid frame optimizes the strength and quality of the bond achieved using solvent bonding techniques.

Using conventional solvent bonding techniques to bond the rigid frame to porous flexible membrane 106, a solvent that is capable of dissolving a surface of the rigid frame material (e.g., for a PVC frame, acetone, N,N-dimethylformamide (DMF), methyl ethyl ketone (MEK), and tetrahydrofuran (THF)) is applied to the frame material and/or porous flexible membrane 106 at their respective bonding sites subsequent to cleaning and drying of the bonding sites. In some embodiments, the solvent used may be capable of dissolving a surface of the frame material, but be compatible with the porous flexible membrane 106 material. The applied solvent dissolves a surface of the frame material at its bonding site. After the applied solvent has dissolved at least some of the frame material, porous flexible membrane 106 may be pressed to the rigid frame material. In certain embodiments, a mechanical press may be used to press porous flexible membrane 106 to the frame (e.g., a pneumatic press used with a pressure of 10-50 PSI, which is equivalent to about 69-340 kPa). As the applied solvent evaporates, the rigid material and porous flexible membrane 106 are bonded (i.e., fused) by way of a surface bond at their bonding sites.

As discussed above, porous flexible membrane 106 may be a porous flexible membrane that absorbs moisture and expands when placed in an aqueous solution (i.e., wetted). Accordingly, if porous flexible membrane 106 is mounted to the rigid frame using conventional solvent bonding techniques in a non-aqueous medium and later wetted, porous flexible membrane 106 may expand and ripple (e.g., become non-planar) within the frame. As porous flexible membrane 106 expands, the spacing between porous flexible membrane 106 and electrodes 102 and 104 within each half-cell 108-110 becomes uneven (e.g., distance 120 illustrated in FIG. 1 may differ from distance 122). This uneven spacing may cause electrolyte within half-cells 108 and 110 to be unevenly distributed. Further, electrolyte flow resistance across each of half-cells 108 and 110 may vary. For example, electrolyte flow resistance across half-cell 110 may be greater at distance 122 than that across distance 120. In this manner, rippling of porous flexible membrane 106 may adversely affect the overall efficiency of redox flow cell 100 if conventional solvent bonding techniques are utilized in mounting porous flexible membrane 106 to a rigid frame. The rippling may also result in cracking or mechanical fatigue when the membrane is assembled in a cell under pressure. Such cracks will result in intra-cellular leaks and adversely affect the efficiency of the system.

Figure 2:
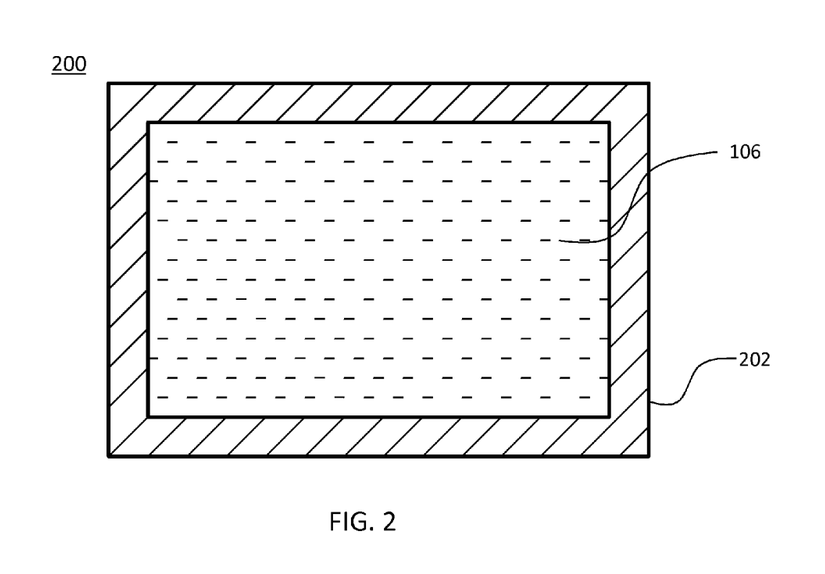
FIG. 2 illustrates a porous flexible membrane material bonded to a rigid frame consistent with embodiments of the present invention.

FIG. 2 illustrates an assembly 200, which includes a porous flexible membrane 106 bonded to a rigid frame 202 consistent with some embodiments of the present invention. As shown in FIG. 2, porous flexible membrane 106 may be an IEM, and may be the porous flexible membrane 106 utilized in the redox flow cell 100 illustrated in FIG. 1. As shown in FIG. 2, porous flexible membrane 106 may be bonded to a rigid frame 202. In certain embodiments, rigid frame 202 may be constructed using PVC material. In certain other embodiments, rigid frame 202 may be constructed using other rigid materials capable of being bonded to porous flexible membrane 106 using solvent bonding techniques.

Rigid frame 202 may be designed to provide support for mounting porous flexible membrane 106 within redox flow cell 100 and to ensure that porous flexible membrane 106 and electrodes 102 and 104 are evenly spaced within each half-cell 108 and 110. Providing even spacing between porous flexible membrane 106 and electrodes 102 and 104 optimizes the efficiency of redox flow cell 100 by ensuring an even distribution of electrolyte within half-cells 108 and 110 and equal electrolyte flow resistance through half-cells 108 and 110. In certain embodiments, rigid frame 202 may be constructed using a single piece of rigid material (e.g., PVC and PMMA). In certain other embodiments, rigid frame 202 may be constructed using multiple pieces of rigid material bonded together and, in certain embodiments, may be bonded to both sides of porous flexible membrane 106 at its bonding site, as discussed below in reference to FIG. 8.

Figure 3:
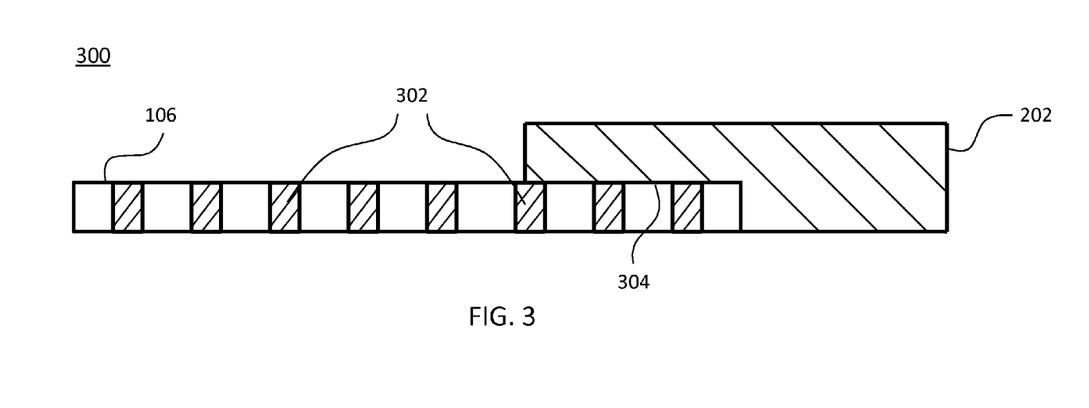
FIG. 3 illustrates a bonding site of a porous flexible membrane material and a rigid frame bonded using conventional solvent bonding techniques.

FIG. 3 is a cross-sectional view 300 of the porous flexible membrane and rigid frame assembly 300. FIG. 3 illustrates a bonding site of a porous flexible membrane 106 and a rigid frame 202 bonded using conventional solvent bonding techniques. Porous flexible membrane 106 includes pores 302. Although in FIG. 3 simple cylindrical pores are shown, the pores may have various diameters, diameter variations, penetration, and tortuosity. In certain embodiments, porous flexible membrane material 106 may be an IEM utilized in the redox flow cell 100 illustrated in FIG. 1. As shown in FIG. 3, porous flexible membrane 106 may be bonded to rigid frame 202 at bonding site 304. Rigid frame 202 may be constructed using PVC material, PMMA material, or other rigid materials capable of being bonded to porous flexible membrane 106 using solvent bonding techniques.

As discussed above, porous flexible membrane 106 may be bonded to rigid frame 202 using conventional solvent bonding techniques. Utilizing such techniques, the bonding site 304 of porous flexible membrane 106 may be cleaned and dried prior to bonding such that particulates and/or moisture at bonding site 304 are removed. Cleaning and drying bonding site 304 of porous flexible membrane 106 optimizes the strength and quality of the bond achieved using solvent bonding techniques. To bond rigid frame 202 to porous flexible membrane 106, a solvent that is capable of dissolving a surface of the frame 202 material (e.g., for a PVC frame, acetone, DMF, MEK, and THF) is applied to the rigid frame 202 and/or porous flexible membrane 106 at bonding site 304 after bonding site 304 has been cleaned and dried. The solvent used may be capable of dissolving a surface of rigid frame 202 material, but be compatible with the porous flexible membrane 106 material. The applied solvent dissolves the rigid frame 202 material at bonding site 304. After the applied solvent has dissolved at least some of the rigid frame 202 material, porous flexible membrane 106 may be pressed to rigid frame 202 at bonding site 304. As the applied solvent evaporates, rigid frame 202 and porous flexible membrane 106 are bonded (i.e., fused) by way of a surface bond at bonding site 304.

Figure 4:
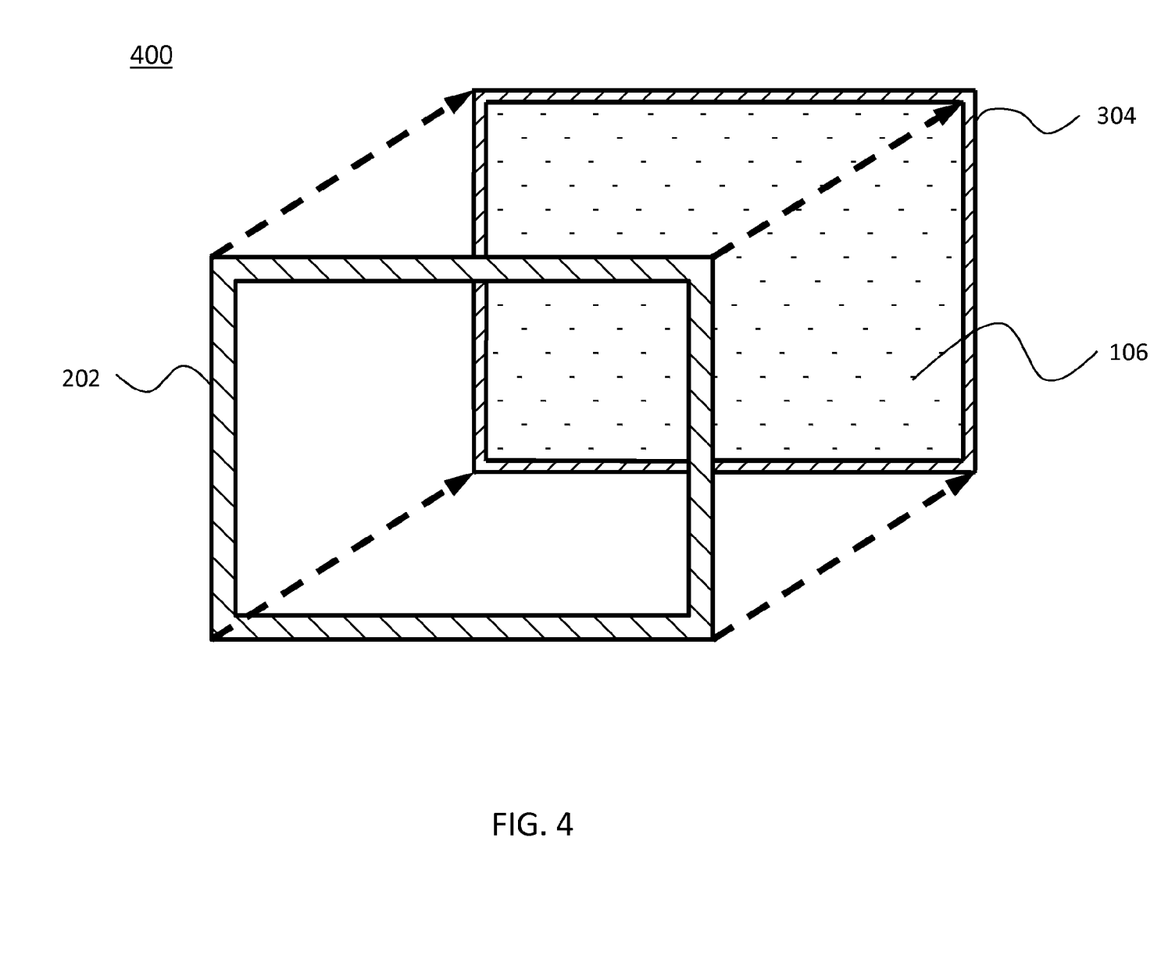
FIG. 4 illustrates an assembly direction for bonding a porous flexible membrane material that has been pre-treated for bonding at its bonding site consistent with embodiments of the present invention.

FIG. 4 shows the assembly direction 400 for bonding the porous membrane with the rigid frame. FIG. 4 illustrates a porous flexible membrane 106 that has been pre-treated for bonding at its bonding site 304 consistent with embodiments of the present invention. In some embodiments, porous flexible membrane 106 may be an IEM utilized in the redox flow cell 100 illustrated in FIG. 1. In some embodiments, rigid frame 202 may be constructed using PVC material, PMMA material, or other rigid materials capable of being bonded to porous flexible membrane 106 using solvent bonding techniques.

As discussed above, porous flexible membrane 106 may absorb moisture and expand when placed in an aqueous solution. Accordingly, if porous flexible membrane 106 is bonded to rigid frame 202 in a non-aqueous medium (e.g., when porous flexible membrane 106 is bonded using conventional solvent bonding techniques) and later wetted, porous flexible membrane 106 may expand and ripple (i.e., become non-planar) within rigid frame 202, thereby reducing the overall efficiency of redox flow cell 100.

The problems associated with the expansion of porous flexible membrane 106 within rigid frame 202 may be reduced by bonding porous flexible membrane 106 to rigid frame 202 while porous flexible membrane 106 is in a wetted state (e.g., has been placed in an aqueous solution), and, therefore, expanded due to absorption of moisture. If bonded to rigid frame 202 in a wetted state and as porous flexible membrane 106 dries and contracts, porous flexible membrane 106 may remain planar (e.g., drum-like) within rigid frame 202. When placed in an aqueous solution, porous flexible membrane 106 may expand but will not ripple within rigid frame 202 if porous flexible membrane 106 was bonded to rigid frame 202 in the aforementioned manner (i.e., bonded in a wetted state).

Solvent bonding, however, ideally requires that bonding site 304 between porous flexible membrane 106 and rigid frame 202 be free of particulate matter and moisture prior to bonding. Accordingly, in conventional solvent bonding, as discussed above, porous flexible membrane 106 and rigid frame 202 are often cleaned and dried at bonding site 304 prior to bonding porous flexible membrane 106 and rigid frame 202 in order to achieve the best possible bond. As drying bonding site 304 while simultaneously ensuring that the rest of porous flexible membrane 106 remains in a wetted state is often ineffective, wetting porous flexible membrane 106 prior to bonding porous flexible membrane 106 to rigid frame 202 often proves impracticable.

To alleviate the aforementioned problems associated with conventional solvent bonding techniques regarding bonding rigid frame 202 to porous flexible membrane 106 while porous flexible membrane 106 is in a wetted state (e.g., an expanded state), a solvent bonding pre-treatment may be applied at the bonding site 304 of porous flexible membrane 106, as shown in FIG. 4. To pre-treat bonding site 304, a solvent solution carrying a certain amount of residue material (e.g., polymeric residue) similar to the material used in rigid frame 202 is applied to the bonding site 304 of porous flexible membrane 106. For example, if rigid frame 202 is constructed using PVC, a pre-treatment solvent solution (e.g., acetone and/or DMF) that includes a certain amount of dissolved PVC residue may be applied to bonding site 304 of porous flexible membrane 106. In certain embodiments, the PVC residue used to pre-treat bonding site 304 may be low molecular weight PVC and/or intermediate molecular weight PVC.

In some embodiments, the pre-treatment solvent solution may be applied to the bonding site 304 of porous flexible membrane 106 manually. The application of pre-treatment solvent solution may also be applied to the bonding site 304 of porous flexible membrane 106 via automated means such as, for example, a computer numerical control (CNC) machine or a machine configured to submerse the edges (e.g., bonding site 304) of porous flexible membrane 106 into the pre-treatment solvent solution.

Referring to FIG. 3, the pre-treatment solvent solution evaporates from bonding site 304, the residue material (e.g., polymeric residue) carried by the pre-treatment solvent solution remains on porous flexible membrane 106. In certain embodiments, the residue material dissolved in the pre-treatment solvent solution may be arranged such that the dissolved material impregnates pores 302 of porous flexible membrane 106 when the pre-treatment solvent solution is applied. Accordingly, when the pre-treatment solvent solution evaporates, the pores 302 of porous flexible membrane 106 at pre-treated bonding site 304 may be filled with the residue material (e.g., polymeric residue) dissolved in the pre-treatment solvent solution. Additionally, a thin layer of residue material may also remain on the surface of porous flexible membrane 106 at pre-treated bonding site 304 after application and drying of the pre-treatment solvent solution. In certain embodiments, pre-treatment may be applied multiple times if residue filling in a single step is not sufficient.

In certain embodiments, impregnating the pores 302 of porous flexible membrane 106 with residue material and/or depositing a thin layer of residue material on the surface of porous flexible membrane 106 at pre-treated bonding site 304 causes porous flexible membrane 106 at pre-treated bonding site 304 to be extremely hydrophobic. Accordingly, if wetted, then porous flexible membrane 106 may expand as it absorbs moisture except at pre-treated bonding site 304. In certain embodiments, the residue material dissolved in the pre-treatment solvent solution impregnating the pores 302 of porous flexible membrane 106 may be arranged using soft materials (e.g., low molecular weight and/or intermediate molecular weight PVC), such that the areas of porous flexible membrane 106 at pre-treated bonding site 304 are not adversely affected by the expansion of the non-treated areas of porous flexible membrane 106.

As pre-treated bonding site 304 is hydrophobic, after wetting porous flexible membrane 106, pre-treated bonding site 304 may be dried manually or automatically independent of the non-treated areas of porous flexible membrane 106. While the non-treated areas of porous flexible membrane 106 are in a wetted state, rigid frame 202 may be bonded to porous flexible membrane 106 at the pre-treated bonding site using solvent bonding techniques. To bond the rigid frame to porous flexible membrane 106, a solvent that is capable of dissolving a surface of the rigid frame 202 material and the pre-treatment residue material (e.g., for a PVC frame, acetone, DMF, MEK, and THF) is applied at the pre-treated bonding site 304 of porous flexible membrane 106. In certain embodiments, solvent material may also be applied to the corresponding bonding site of rigid frame 202. The applied solvent dissolves at least some of the pre-treatment residue material at pre-treated bonding site 304 and/or the rigid frame 202 material at its corresponding bonding site. Porous flexible membrane 106 may then be pressed to the rigid frame 202. As the applied solvent evaporates, rigid frame 202 and porous flexible membrane 106 are bonded (e.g., fused) at pre-treated bonding site 304 by way of a volume bond. As discussed below in reference to FIGS. 5-8 and 9A-C, this bonding technique provides a stronger bond than that obtained using a surface solvent bonding technique.

If bonded to rigid frame 202 using the aforementioned pre-treatment solvent bonding technique while the non-treated areas of porous flexible membrane 106 are wetted, as the non-treated areas of porous flexible membrane 106 dry and contract, porous flexible membrane 106 will remain planar within rigid frame 202. As porous flexible membrane 106 was bonded to frame 202 in a wetted state, when placed in an aqueous solution, porous flexible membrane 106 may expand but will not ripple within rigid frame 202. Accordingly, if integrated into the redox flow cell 100 illustrated in FIG. 1, porous flexible membrane 106 bonded to rigid frame 202 using the aforementioned pre-treatment solvent bonding technique will remain planar even when submerged in an aqueous electrolyte solution, thereby reducing the problems associated with the rippling of porous flexible membrane 106 within redox flow cell 100.

Figure 5:
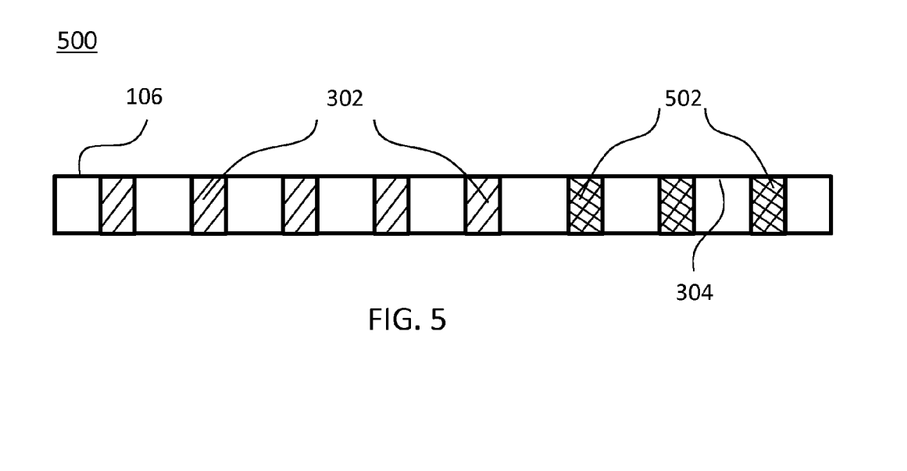
FIG. 5 illustrates a detailed view of the bonding site of a porous flexible membrane material that has been pre-treated for bonding consistent with embodiments of the present invention.

FIG. 5 illustrates a detailed view 500 of the bonding site 304 of a porous flexible membrane 106 that has been pre-treated for bonding consistent with embodiments of the present invention. Porous flexible membrane 106 includes pores 302. In certain embodiments, porous flexible membrane 106 may be an IEM utilized in the redox flow cell 100 illustrated in—FIG. 1. As shown in FIG. 5, porous flexible membrane 106 may be pre-treated at bonding site 304 with a pre-treatment solvent solution. As discussed above, the pre-treatment solvent solution carries a certain amount of dissolved residue material similar to the material used in rigid frame 202. For example, if rigid frame 202 is construed using PVC, a pre-treatment solvent solution (e.g., acetone and/or DMF) that includes a certain amount of dissolved PVC residue may be applied to bonding site 304 of porous flexible membrane 106. In certain embodiments, the PVC residue used to pre-treat bonding site 304 may be a low molecular weight PVC and/or a soft PVC reside.

In certain embodiments, the residue material dissolved in the pre-treatment solvent solution may be arranged such that the dissolved material impregnates the pores of porous flexible membrane 106 when the pre-treatment solvent solution is applied. Thus, as shown in FIG. 5, pores 502 at bonding site 304 may be filled with the dissolved residue material. As the applied pre-treatment solvent solution evaporates from bonding site 304, the residue material remains in pores 502.

Figure 6:
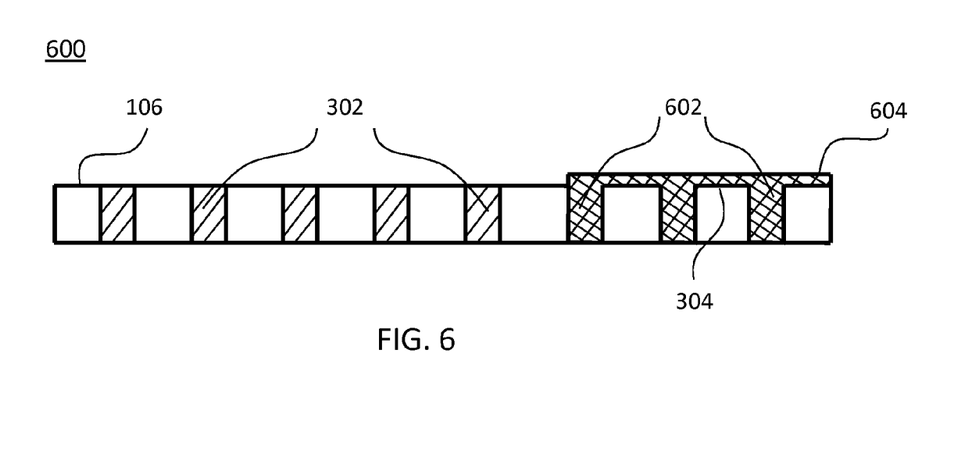
FIG. 6 illustrates a detailed view of the bonding site of a porous flexible membrane material that has been pre-treated for bonding consistent with embodiments of the present invention.

FIG. 6 illustrates a detailed view 600 of the bonding site 304 of a porous flexible membrane material 106 that has been pre-treated for bonding consistent with embodiments of the present invention. Porous flexible membrane 106 includes pores 302. In certain embodiments, porous flexible membrane 106 may be an IEM utilized in redox flow cell illustrated in FIG. 1. As shown in FIG. 5, porous flexible membrane 106 may be pre-treated at bonding site 304 with a pre-treatment solvent solution.

As discussed above, in certain embodiments, the residue material dissolved in the pre-treatment solvent solution may be arranged such that the dissolved material impregnates the pores of porous flexible membrane 106 when the pre-treatment solvent solution is applied. Thus, as shown in FIG. 6, pores 602 may be filled with the dissolved residue material. As the applied pre-treatment solvent solution evaporates from bonding site 304, the residue material remains in pores 602. In addition, a thin layer 604 of residue material may also remain on the surface of porous flexible membrane 106 at pre-treated bonding site 304 after application and drying of the pre-treatment solvent solution. While FIG. 6 only illustrates a single layer 604 deposited on one side of porous flexible membrane 106, in certain embodiments a second thin layer may also be deposited on the opposite side of porous flexible membrane 106, thereby created two bonding sites 304 on either side of porous flexible membrane 106.

Figure 7:
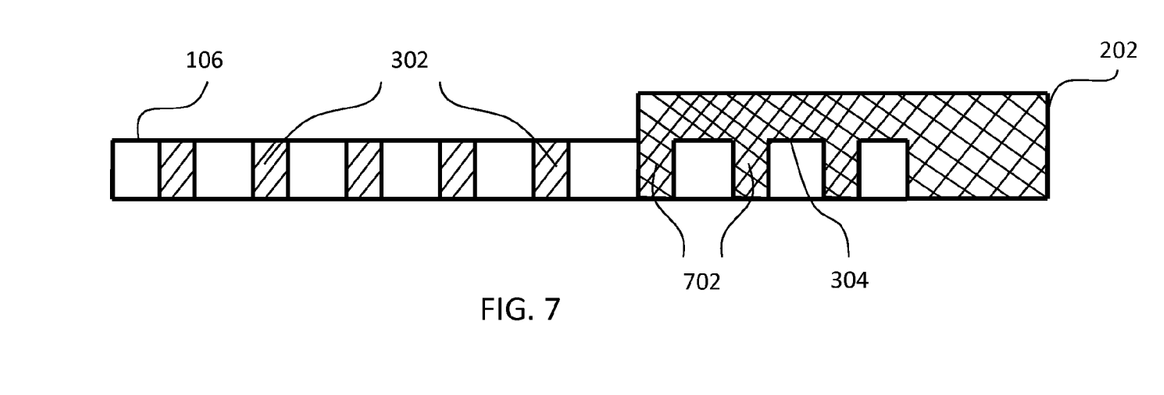
FIG. 7 illustrates a bonding site of a porous flexible membrane material and a rigid structure bonded using solvent bonding techniques consistent with embodiments of the present invention.

FIG. 7 illustrates a bonding site 304 of a porous flexible membrane material 106 and a rigid frame 202 bonded using solvent bonding techniques consistent with embodiments of the present invention. Porous flexible membrane 106 includes pores 302. In some embodiments, porous flexible membrane 106 may be an IEM utilized in the redox flow cell 100 illustrated in FIG. 1. In some embodiments, rigid frame 202 may be a rigid frame constructed using PVC material. In some embodiments, rigid frame 202 may be constructed using other rigid materials capable of being bonded to porous flexible membrane 106 using solvent bonding techniques consistent with embodiments of the present invention.

As shown in FIG. 7, porous flexible membrane 106 is bonded to rigid frame 202 at bonding site 304. Prior to bonding, bonding site 304 may be pre-treated with a pre-treatment solvent solution. A pre-treatment bonding solvent solution may carry a certain amount of dissolved residue material similar to the material used in rigid frame 202. For example, if rigid frame 202 is construed using PVC, a pre-treatment solvent solution (e.g., acetone and/or DMF) that includes a certain amount of dissolved PVC residue may be applied to bonding site 304 of porous flexible membrane 106. In certain embodiments, the PVC residue used to pre-treat the bonding site 304 may be a low molecular weight PVC and/or a soft PVC residue.

As discussed in reference to FIGS. 5-6, the residue material dissolved in the pre-treatment solvent solution may be arranged such that the dissolved material impregnates the pores 302 of porous flexible membrane 106 when the pre-treatment solvent solution is applied. Thus, as shown in FIG. 7, pores 702 at bonding site 304 may be filled with the dissolved residue material. As the applied pre-treatment solvent solution evaporates from bonding site 304, the residue material remains in pores 702. Additionally, a thin layer of residue material may also remain on the surface of porous flexible membrane 106 at the pre-treated bonding site 304 after application and drying of the pre-treatment solvent solution.

Porous flexible membrane 106 is bonded at its pre-treated bonding site 304 to rigid frame 202 using a solvent bonding techniques consistent with embodiments of the present invention. Specifically, to bond rigid frame 202 to porous flexible membrane 106, a solvent that is capable of dissolving a surface of the rigid frame 202 material and the pre-treatment residue material (e.g., acetone and/or DMF in the context of a PVC frame and PVC residue material) is applied at the pre-treated bonding site 304 of porous flexible membrane 106. In certain embodiments, solvent material may also be applied to the corresponding bonding site of rigid frame 202. The applied solvent dissolves at least some of the pre-treatment residue material at pre-treated bonding site 304 and/or the rigid frame 202 material at its corresponding bonding site. Porous flexible membrane 106 may then be pressed to the rigid frame 202. As the applied solvent evaporates, rigid frame 202 and porous flexible membrane 106 are bonded (e.g., fused) at pre-treated bonding site 304. As shown in FIG. 7, because the pre-treatment residue material and the rigid frame 202 material are similar, a strong volume bond between porous flexible membrane 106 and rigid frame 202 is created when porous flexible membrane 106 and rigid frame 202 are bonded using solvent bonding techniques consistent with embodiments of the present invention. In some embodiments, this volume bond proves especially effective against damage to the bond caused by shearing forces.

Figure 8:
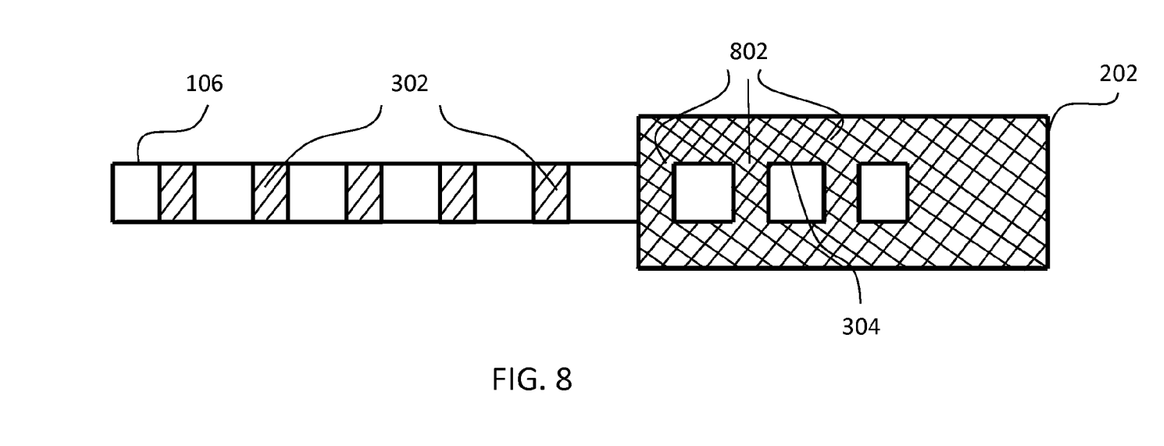
FIG. 8 illustrates a bonding site of porous flexible membrane material and a rigid structure bonded using solvent bonding techniques consistent with embodiments of the present invention.

FIG. 8 illustrates a bonding site 304 of a porous flexible membrane material 106 and a rigid frame 202 bonded using solvent bonding techniques consistent with embodiments of the present invention. Porous flexible membrane 106 includes pores 302. In some embodiments, porous flexible membrane 106 may be an IEM utilized in the redox flow cell 100 illustrated in FIG. 1. In some embodiments, rigid frame 202 may be a rigid frame construed using PVC material. In some embodiments, rigid frame 202 may be constructed using other rigid materials capable of being bonded to porous flexible membrane 106 using solvent bonding techniques consistent with embodiments of the present invention.

As shown in FIG. 8, rigid frame 202 may be bonded to porous flexible membrane 106 using the aforementioned pre-treatment solvent bonding techniques. Pre-treatment residue material may be deposited within pores 802 at bonding site 304. A solvent that is capable of dissolving a surface of the rigid frame 202 material and the pre-treatment residue material is applied at the pre-treated bonding site 304 of porous flexible membrane 106. In certain embodiments, solvent material may also be applied to the corresponding bonding sites on rigid frame 202. Porous flexible membrane 106 is pressed to rigid frame 202 at the corresponding bonding sites 304. As shown in FIG. 8, a strong volume bond between porous flexible membrane 106 and rigid frame 202 may be created as rigid frame 202 is bonded to both sides of porous flexible membrane 106. In certain embodiments, this volume bond proves especially effective against damage to the bond caused by shearing forces.

Figure 9A:
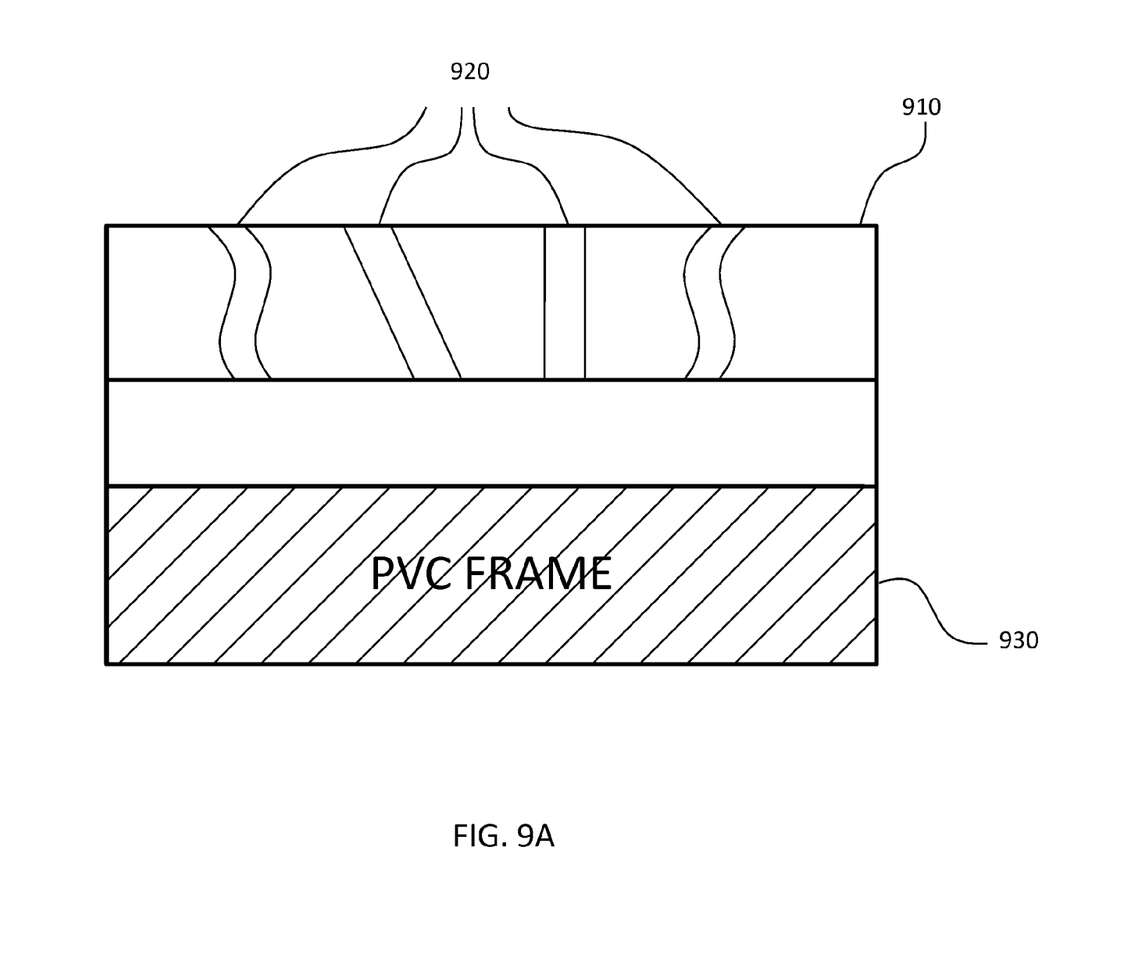
FIGS. 9A, 9B, and 9C illustrate bonding between a porous flexible membrane and a rigid frame.
Figure 9B:
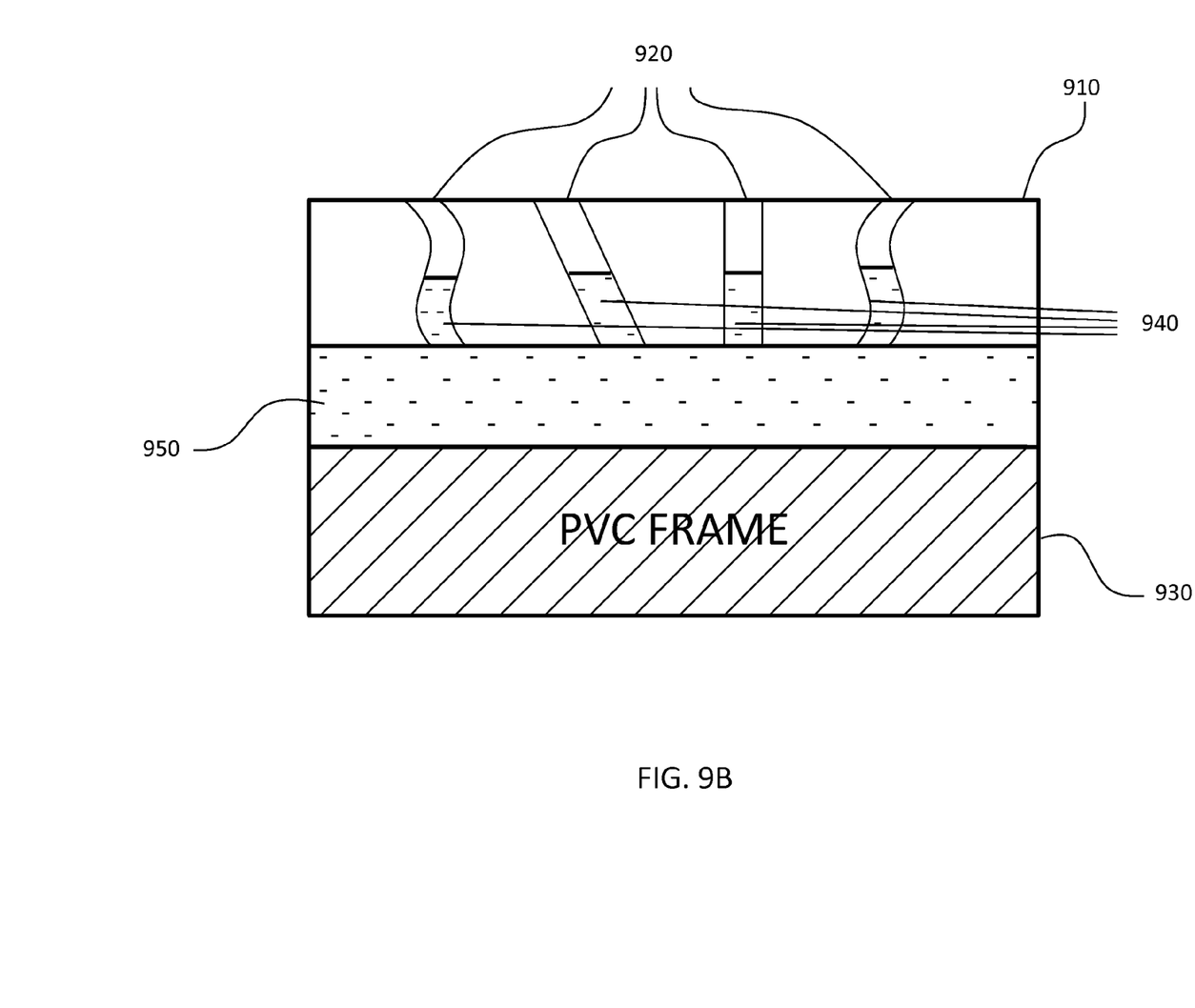

The volume bonding technique provides a stronger bond than that obtained using a conventional solvent bonding technique. FIG. 9A illustrates a rigid frame 930 and porous flexible membrane 910 having pores 920 prior to bonding. FIG. 9B illustrates a rigid frame 930 and porous flexible membrane 910 bonded together with conventional solvent bonding. Conventional solvent bonding fuses two materials together at a molecular level (e.g., PVC-PVC bond using DMF). In embodiments where the porous flexible membrane 910 is not soluble in the solvent (e.g., PVC frame and polyethylene membrane), the bond is established, because the residue 940 in the pores 920 solidifies into a continuous material with the residue material 950 and PVC frame 930. The porous flexible membrane 910 is held in place by friction. Such a bond is not at a molecular level.

Figure 9C:
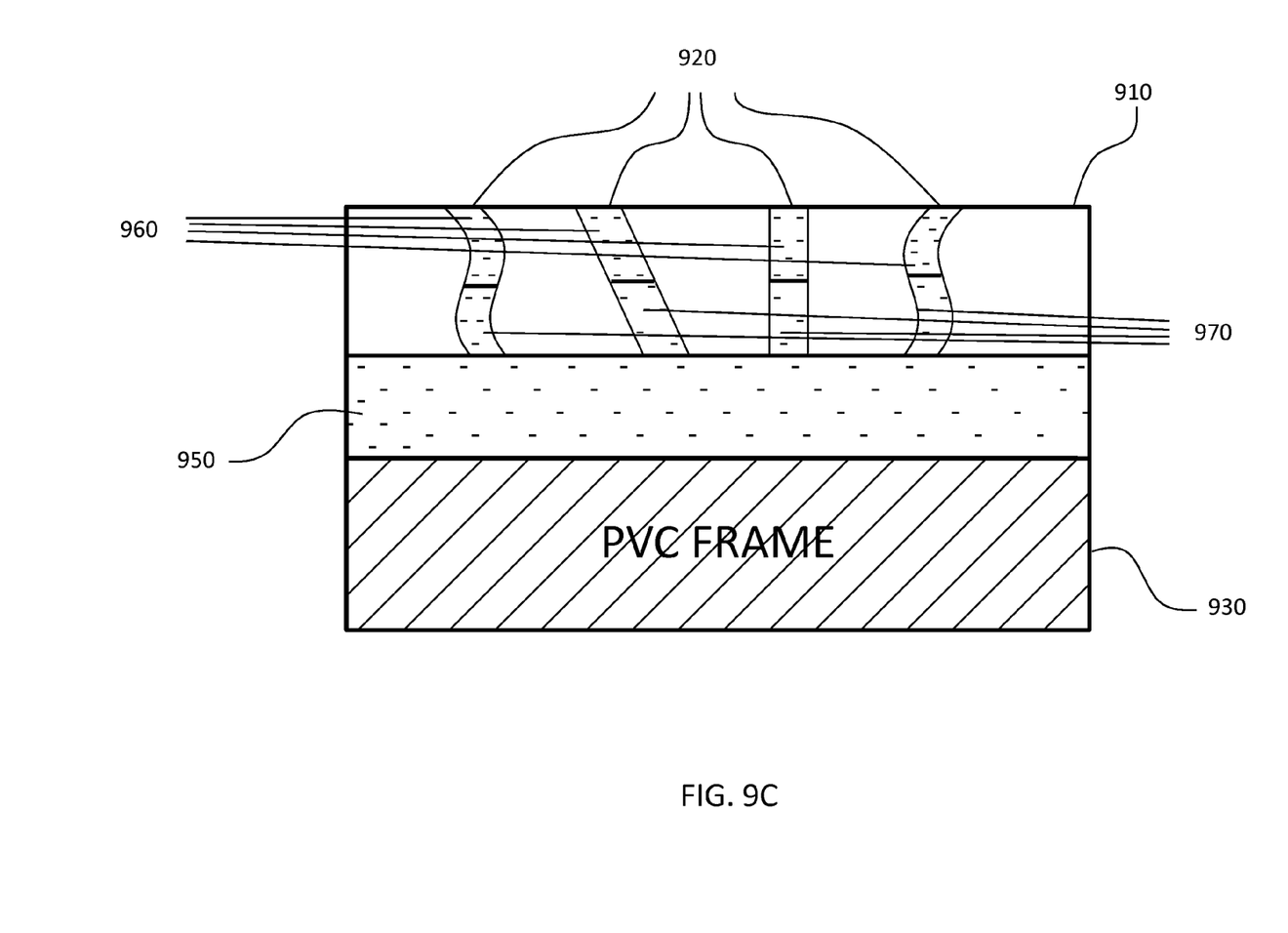

FIG. 9C illustrates a rigid frame 930 and porous flexible membrane 910 bonded together with a volume bonding technique. The tortuosity of the pores 920 gives rise to tortuous residue columns 960 in the porous flexible membrane 910 which are molecularly bonded to the residue material 950 and frame 930. Such formations further increase the frictional attachment 970 of the rigid frame 930 and porous flexible membrane 910. The resulting frictional forces resist delamination of the rigid frame 930 and porous flexible membrane 910. The volume bonding technique is discussed in further detail with reference to FIGS. 5-8.

Figure 10:
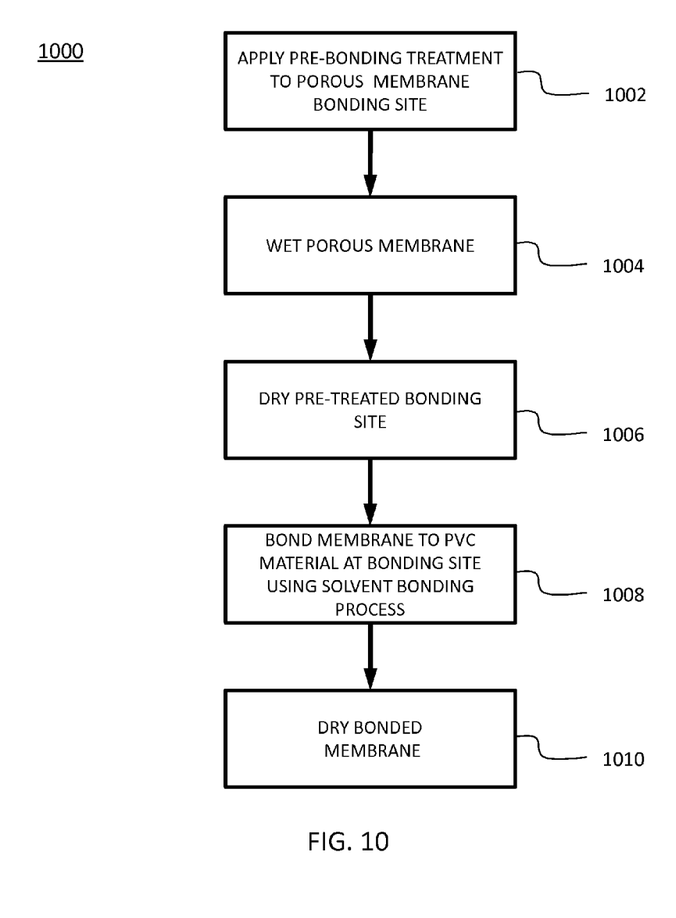
FIG. 10 illustrates a solvent bonding process flow chart consistent with embodiments of the present invention.

FIG. 10 illustrates a solvent bonding process flow chart 1000 consistent with embodiments of the present invention. At step 1002, prior to bonding porous flexible membrane 106 with frame 202, bonding sites 304 of porous flexible membrane 106 may be pre-treated with a pre-treatment solvent solution carrying dissolved residue material similar to the material used to construct frame 202 and arranged to impregnate the ports of porous membrane 106 at bonding site 304. Following pre-treatment of the bonding sites of porous flexible membrane 106, at step 1004, the porous flexible membrane 106 may be placed in an aqueous solution (i.e., wetted).

Porous flexible membrane 106 may expand as it absorbs moisture from the aqueous solution. Once expanded, at step 1006, pre-treated bonding sites 304 may be dried. Because the pre-treatment process makes pre-treated bonding sites 304 extremely hydrophobic, pre-treated bonding sites 304 may be dried independently of the untreated areas of porous flexible membrane 106.

At step 1008, pre-treated porous flexible membrane 106 may be bonded to the rigid frame (e.g., PVC frame) 202 using solvent bonding techniques consistent with embodiments of the invention. Once bonded, at step 1010, the porous flexible membrane 106 may be dried. Because porous flexible membrane 106 was bonded to frame 202 while in a wetted state (e.g., expanded state), when porous flexible membrane 106 within frame 202 is placed in an aqueous solution and expanded, porous flexible membrane 106 will not ripple. In this manner, inefficiencies attributed by rippled IEMs in redox flow cells may be reduced by constructing IEMs using bonding techniques consistent with the present invention.

In the preceding specification, various preferred embodiments have been described with reference to the accompanying drawings. It will, however, be evident that various modifications and changes may be made thereto, and additional embodiments may be implemented, without departing from the broader scope of the invention as set for in the claims that follow. It should be understood that various alternatives to the embodiments of the invention described herein may be employed in practicing the invention. The specification and drawings are accordingly to be regarded in an illustrative rather than restrictive sense. It is intended that the following claims define the scope of the invention and that methods and structures within the scope of these claims and their equivalents be covered thereby.

What is claimed is:

1. A method of preparing a membrane for a flow cell battery comprising:
bonding a membrane to a frame, wherein the membrane is bonded to the frame by the process comprising:
applying, at a bonding site of the membrane, a pre-treatment solvent solution, the pre-treatment solvent solution comprising a first solvent carrying dissolved polymeric residue material, the dissolved polymeric residue material being configured to fill pores of the membrane at the bonding site of the membrane and to render the bonding site of the membrane to be hydrophobic;
drying the bonding site of the membrane;
wetting the membrane to cause the membrane to expand, the membrane not expanding at the hydrophobic bonding site of the membrane;
applying, at a bonding site of the frame, a second solvent that dissolves a surface layer of the frame;
applying, at the bonding site of the membrane, a third solvent that dissolves the polymeric residue material dissolved in the pre-treatment solvent solution; and
pressing the bonding site of the membrane to the bonding site of the frame at their respective bonding sites, wherein the membrane is configured for use in a flow cell battery.

2. The method of claim 1, wherein the membrane is comprised of polyolefin.

3. The method of claim 2, wherein the membrane is filled with silicon dioxide particles.

4. The method of claim 1, wherein the membrane is a porous membrane.

5. The method of claim 1, wherein the membrane is an ion selective membrane.

6. The method of claim 1, wherein the frame is comprised of polyvinyl chloride or poly methyl methacrylate.

7. The method of claim 1, wherein the first solvent is comprised of at least one of acetone, N, N-dimethylformamide (DMF), methyl ethyl ketone (MEK), and tetrahydrofuran (THF).

8. The method of claim 1, wherein the second solvent is comprised of at least one of acetone, N, N-dimethylformamide (DMF), methyl ethyl ketone (MEK), and tetrahydrofuran (THF).

9. The method of claim 1, wherein the third solvent is comprised of at least one of acetone, N, N-dimethylformamide (DMF), methyl ethyl ketone (MEK), and tetrahydrofuran (THF).

10. The method of claim 1, wherein the membrane is pressed to the frame with a pressure of 10-50 PSI (69-340 kPa).

* * * * *